June 25, 1940.  J. BĚLENKIJ  2,205,806
PRESSURE DEVICE FOR HYDRAULIC BRAKES
Filed June 15, 1939
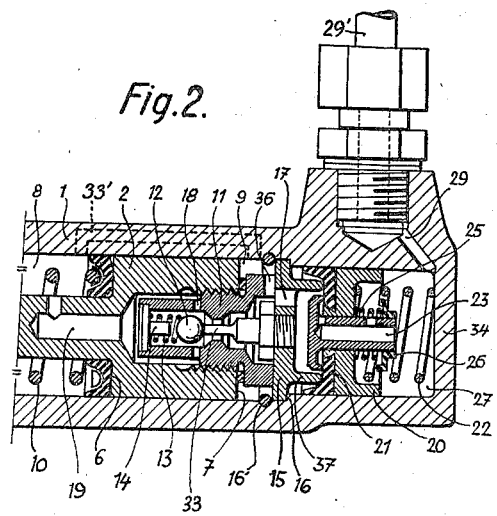
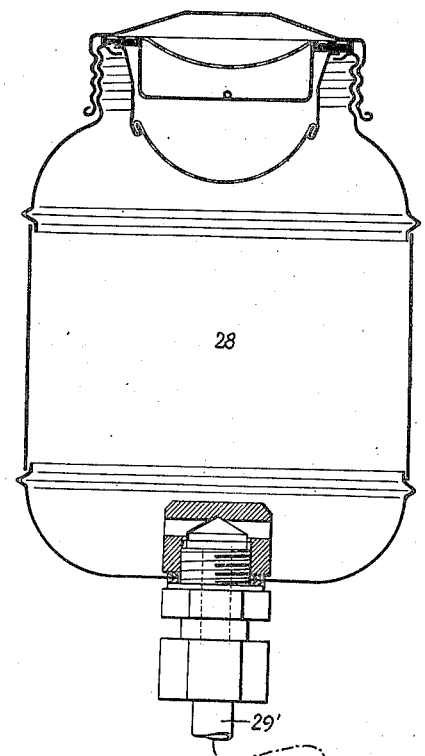
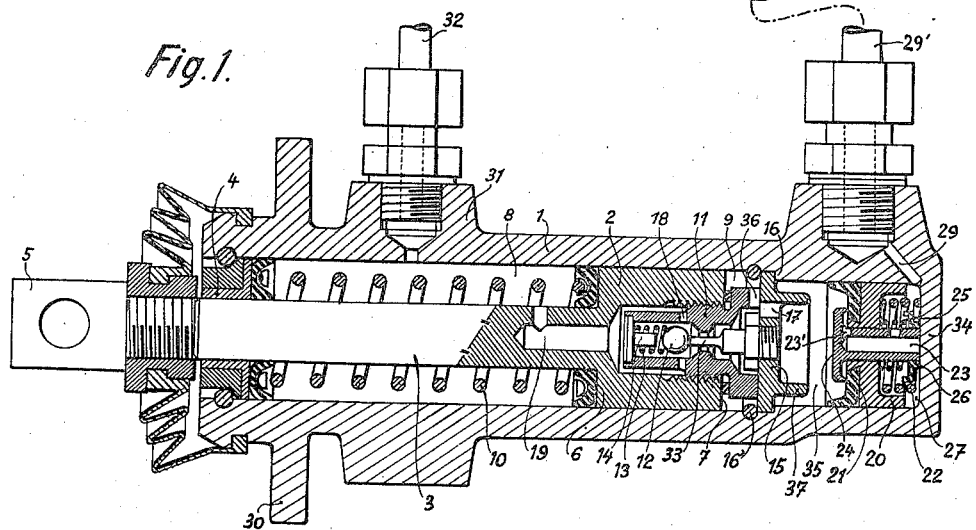

Patented June 25, 1940

2,205,806

UNITED STATES PATENT OFFICE 2,205,806

PRESSURE DEVICE FOR HYDRAULIC BRAKES

Jiří Bělenkij, Olomouc, Czechoslovakia

Application June 15, 1938, Serial No. 213,938
In Czechoslovakia February 9, 1938

12 Claims. (Cl. 60—54.6)

This invention relates to a further improvement in the pressure devices for the hydraulic brakes of motor vehicles, these devices being constructed in such a way that the master pressure cylinder is able to supply fluid to the pressure conduit and the brake cylinders in the vehicle wheels, both during the braking movement of the pedal or hand lever and during the return movement, that is, the releasing movement of the pressure piston. By the arrangement according to the invention, there is obtained a greater reliability in the action of a valve disposed between the fluid supply container and the master pressure cylinder, and accordingly the costs of production are reduced and the arrangement as a whole operates more perfectly. The invention primarily consists in the arrangement of an auxiliary piston, loaded in the direction of suction by a spring, and disposed between the working piston of the device and the fluid supply container, and in the arrangement of a suction valve located in this auxiliary piston. The arrangement is such that the auxiliary piston at the end of its stroke, effected against the action of its spring, opens the connection of the suction space or chamber of the pressure cylinder of the device to the supply container. Further characteristics of the invention will be seen from the following description of one example of construction as illustrated in the accompanying drawing, in which Fig. 1 shows diagrammatically a longitudinal section of the device according to the invention, with parts in their operative position, and Fig. 2 shows a part of the longitudinal section with parts in their position before filling with fluid.

In the form of construction shown, the apparatus is formed with a master pressure cylinder 1 in which a piston 2 works, the piston rod 3 of which piston passes through a suitable packing 4 provided in the cylinder 1 and terminates in a connecting member 5 on which acts a pedal or hand lever, not shown, for actuating the hydraulic brake. The working piston 1 is therefore constructed as a differential piston which has on its working side 6, that is, the side producing the braking effect, an annular surface, but on its other side a full working surface 7. Adjacent the annular surface 6 of the piston is the working space or chamber 8 and adjacent the full surface 7 the suction and pressure space or chamber 9 of the cylinder 1. The piston 2 is loaded by a compression spring 10 which opposes the braking stroke thereof. On the full working surface 7 there is provided a member 11, which is screwed into the piston, and contains a pressure ball valve 12 loaded by a spring 13. The travel of the valve 12 is limited by a stop 14. In front of the full working surface 7 of the piston 2 there is arranged a fixed transverse wall 15 which is held in position by an offset part 16 in the cylinder 1 and a resilient positioning ring 16' or by two resilient positioning rings. The transverse wall 15 is formed with a fluid passage 17, whilst on the face of the member 11 of the piston 2 there is provided a radial groove 36. Fluid passages 18 are arranged at the ball valve 12 and a longitudinal and transverse bore 19, which connects the passages 18 of the valve 12 with the working space 8 of the cylinder is disposed within the piston 2. A stop 33 is mounted on the wall 15 to open the valve 12 when the piston 2 is in its rest position, thus placing the chambers 8 and 9 in direct communication. A by-pass 33', as shown in Fig. 2, may be used to supplement or in place of the stop 33, the by-pass opening into chamber 8 immediately in front of the piston 2 when the latter is in its rest position. An auxiliary piston 20, which is provided on the side facing the transverse wall 15 with a packing cup 21, is arranged in the cylinder in front of the transverse wall 15. The piston 20 is pressed against the transverse wall 15 by means of a spring 22. A suction valve 24, which bears on the cup 21 so that the latter forms at the same time the seating for the valve 24, is mounted in the auxiliary piston 20 by means of its tubular open ending spindle 23 having beneath the valve 24 a connecting aperture 23'. The valve 24 is pressed against the packing cup 21 by the pressure of a spring 25 interposed between a collar 26 on the end of the spindle 23 and the transverse wall of the piston 20. The space 27 in the cylinder 1 behind the auxiliary piston 20, which is closed by the base 34 of the cylinder 1, is connected by a bore 29 in the cylinder wall and a pipe 29' to the interior of the fluid supply container 28.

In order to secure the master pressure cylinder 1 to the vehicle framework, a flange 30 may, for example, be provided, by means of which the master pressure cylinder can be secured to any suitable point, for example to a flange of the vehicle frame. Instead of a flange any other means, for example two adjusting nuts, can be used for securing the cylinder 1 to the vehicle.

In the drawing, Fig. 2 shows the parts of the device in a position corresponding to the condition prior to the filling of the entire device with fluid. After being filled with fluid and exhausted of air the described device operates in the following manner:

On the first braking movement of the pedal or hand lever (starting from the position of the parts according to Fig. 2) the piston 2, by means of the member 5, is moved in the cylinder 1 to the left of the drawing. In this way the space 8 in the pressure cylinder 1 is diminished in size and the fluid is forced out of this space through the connecting branch pipe 31 into the pressure pipe 32 leading to the brake cylinders in the vehicle wheels, not shown in the drawing. At the same time the space 9 behind the piston 2 increases in size and the fluid from the supply container 28 opens the valve 24 and passes through the passage 17 of the transverse wall 15 to fill the space 9. On the return movement of the piston (to the right of the drawing) the valve 24 is closed by the pressure of its spring 25 and by the action of the excess pressure in the space 9 and the fluid in the space 9 opens the ball valve 12 in the piston 2 and flows past this valve through the passages 18 and the bores 19 into the space 8 of the cylinder 1. For this reason, even on the return movement of the piston, no suction effect, and, therefore, no reduced pressure can arise in this space 8. At the end of the return movement of the piston 2 the ball valve 12 bears against a stop 33 arranged in the transverse wall 15 and is lifted by the same into its open position. If, on the return movement of the piston 2, the fluid pressure in the space 9 of the cylinder 1 has attained a value equal to the force of the spring 22 loading the auxiliary piston 20, then this auxiliary piston commences, together with the piston 2, to move against the pressure of the spring 22 towards the rear end 34 of the cylinder 1. The valve 24 is accordingly also moved until, nearly at the end of the stroke, the end of its tubular spindle 23 bears against the rear end 34 (see Figure 1) and is thereupon lifted from its seat, so that the excess fluid escapes from the space 9 back into the container 28. Directly after this the auxiliary piston 20 is again pressed back a short distance towards the left (in the drawing) by the spring 22 and in this way the suction valve 24 is closed again by its spring 25, so that the auxiliary piston 20 remains in the neighbourhood of the rear end 34 of the cylinder 1, that is, according to the drawing, the right-hand position, with the spring 22 compressed as illustrated in Fig. 1. The spring 22 exerts a continuous pressure on the fluid, in the space 9 of the master cylinder 1 and in the space 35 behind the transverse wall 15, in front of the auxiliary piston 20, and represents a supply of pressure fluid which is always available to make up for any loss of pressure fluid which may occur in the working space 8 of the cylinder 1 and in the brake conduit 32, as the pressure of the supply fluid in the spaces 9 and 35 is transmitted through the open ball valve 12 to the fluid in the space 8. As can be seen, the pressure in the spaces or chambers 8, 9 and 35 of the cylinder 1 cannot exceed a certain amount determined by the strength of the spring 22, which is so chosen as not to oppose the possibility of a removal of the load on the brake blocks in the vehicle wheels by the action of the springs drawing these blocks together.

With further braking movements of the pedal or the hand lever, the auxiliary piston 20, on the movement of the working piston 2, moves towards the left, until it reaches the end of its stroke. This end is, for example, determined by an axial flange 37 of the stationary transverse wall 15, the valve 24 lying in the hollow space of the annular flange 37. Should a further braking movement of the piston 2 then take place, the valve 24 opens and the piston 2 draws in fresh fluid from the supply container 28. On the return movement of the piston 2 the above described operation takes place.

In the arrangement according to the invention, it is not possible, as often happens in the prior constructions of double valve of a hydraulic brake, on a sudden increase in pressure (for example by a rise in temperature) for the valve to be lifted and, before it can close again, for such a large quantity of fluid to flow from the pressure cylinder and the brake conduits into the supply container that the positive pressure of the cylinder, in the released condition of the brakes, is lost. The supply of pressure fluid in the spaces 9 and 35, according to the invention, provides a compensation of volume variations in the fluid in the brake conduits and the brake cylinders in the vehicle wheels, which would otherwise occur with temperature changes. By means of the arrangement of a storage space or chamber 35 for the fluid between the main piston 2 and the auxiliary piston 20, the brake pedal or the hand lever has, under all circumstances, an equally long stroke, as a result of which the certainty of braking action is considerably increased.

I claim:

1. In a pressure device for hydraulic brakes of motor vehicles a master pressure cylinder, a differential working piston in the cylinder and forming therewith an annular chamber and a full-surfaced chamber at opposite sides of the piston, pressure piping connected to the annular chamber of the cylinder, a pressure valve in a passage between said chambers and opening towards the annular chamber, means for connecting the annular chamber and the full-surface chamber of the master cylinder in the rest position of the piston, an auxiliary piston disposed in a cylinder chamber between the differential piston and a fluid supply, a pressure spring loading the auxiliary piston towards the working piston, a stop for the two pistons between them and a spring loaded suction valve located in the auxiliary piston and opened by the suction stroke of the working piston.

2. In a pressure device for hydraulic brakes of motor vehicles a master pressure cylinder, a differential working piston in the cylinder and forming therewith an annular chamber and a full-surfaced chamber at opposite sides of the piston, pressure piping connected to the annular chamber of the cylinder, a pressure valve in a passage between said chambers and opening towards the annular chamber, means for connecting the annular chamber and the full-surface chamber of the master cylinder in the rest position of the piston, an auxiliary piston disposed in the master cylinder coaxially with the working piston between the differential piston and a fluid supply, a pressure spring loading the auxiliary piston towards the working piston, a stop for the two pistons between them and a spring loaded suction valve located in the auxiliary piston and opened by the suction stroke of the working piston.

3. In a pressure device for hydraulic brakes of motor vehicles a master pressure cylinder, a differential working piston in the cylinder and forming therewith an annular chamber and a full-surfaced chamber at opposite sides of the piston, pressure piping connected to the annular chamber of the cylinder, a pressure valve in a passage between said chambers and opening towards the annular chamber, means for connecting the annular chamber and the full-surface chamber of the master cylinder in the rest position of the piston, an auxiliary piston disposed in a cylinder chamber between the differential piston and a fluid supply, a pressure spring loading the auxiliary piston towards the working piston, a stop for the two pistons between them, a spring loaded suction valve located in the auxiliary piston and opened by the suction stroke of the working piston, and a stop arranged at the end of the chamber of the auxiliary piston and lifting the suction valve in the said piston on the end of the backward stroke of the auxiliary piston.

4. In a pressure device for hydraulic brakes of motor vehicles a master pressure cylinder, a differential working piston in the cylinder and forming therewith an annular chamber and a full-surfaced chamber at opposite sides of the piston, pressure piping connected to the annular chamber of the cylinder, a pressure valve in a passage between said chambers and opening towards the annular chamber, means for connecting the annular chamber and the full-surface chamber of the master cylinder in the rest position of the piston, an auxiliary piston disposed in the master cylinder coaxially with the working piston between the differential piston and a fluid supply, a pressure spring loading the auxiliary piston towards the working piston, a stop for the two pistons between them, a spring loaded suction valve located in the auxiliary piston and opened by the suction stroke of the working piston, and a stop arranged at the end of the master cylinder and lifting the suction valve in the auxiliary piston on the end of the backward stroke of the said piston.

5. In a pressure device for hydraulic brakes of motor vehicles a master pressure cylinder, a differential working piston in the cylinder and forming therewith an annular chamber and a full-surfaced chamber at opposite sides of the piston, pressure piping connected to the annular chamber of the cylinder, a pressure valve in a passage between said chambers and opening towards the annular chamber, means for connecting the annular chamber and the full-surface chamber of the master cylinder in the rest position of the piston, an auxiliary piston disposed in a cylinder chamber between the differential piston and a fluid supply, a pressure spring loading the auxiliary piston towards the working piston, a stop for the two pistons between them, a spring loaded suction valve located in the auxiliary piston and opened by the suction stroke of the working piston, the packing cup of the auxiliary piston forming a seat of the said suction valve.

6. In a pressure device for hydraulic brakes of motor vehicles a master pressure cylinder, a differential working piston in the cylinder and forming therewith an annular chamber and a full-surfaced chamber at opposite sides of the piston, pressure piping connected to the annular chamber of the cylinder, a pressure valve in a passage between said chambers and opening towards the annular chamber, means for connecting the annular chamber and the full-surface chamber of the master cylinder in the rest position of the piston, an auxiliary piston disposed in the master cylinder coaxially with the working piston between the differential piston and a fluid supply, a pressure spring loading the auxiliary piston towards the working piston, a stop for the two pistons between them, a spring loaded suction valve located in the auxiliary piston and opened by the suction stroke of the working piston, the packing cup of the auxiliary piston forming a seat of the said suction valve.

7. In a pressure device for hydraulic brakes of motor vehicles a master pressure cylinder, a differential working piston in the cylinder and forming therewith an annular chamber and a full-surfaced chamber at opposite sides of the piston, pressure piping connected to the annular chamber of the cylinder, a pressure valve in a passage between said chambers and opening towards the annular chamber, means for connecting the annular chamber and the full-surface chamber of the master cylinder in the rest position of the piston, an auxiliary piston disposed in a cylinder chamber between the differential piston and a fluid supply, a pressure spring loading the auxiliary piston towards the working piston, a stop for the two pistons between them, a spring loaded suction valve located in the auxiliary piston and opened by the suction stroke of the working piston, the packing cup of the auxiliary piston forming a seat of the said suction valve, and a stop arranged at the end of the chamber of the auxiliary piston and lifting the suction valve in the said piston on the end of the backward stroke of the auxiliary piston.

8. In a pressure device for hydraulic brakes of motor vehicles a master pressure cylinder, a differential working piston in the cylinder and forming therewith an annular chamber and a full-surfaced chamber at opposite sides of the piston, pressure piping connected to the annular chamber of the cylinder, a pressure valve in a passage between said chambers and opening towards the annular chamber, means for connecting the annular chamber and the full-surface chamber of the master cylinder in the rest position of the piston, an auxiliary piston disposed in the master cylinder coaxially with the working piston between the differential piston and a fluid supply, a pressure spring loading the auxiliary piston towards the working piston, a stop for the two pistons between them, a spring loaded suction valve located in the auxiliary piston and opened by the suction stroke of the working piston, the packing cup of the auxiliary piston forming a seat of the said suction valve, and a stop arranged at the end of the chamber of the auxiliary piston and lifting the suction valve in the said piston on the end of the backward stroke of the auxiliary piston.

9. In a pressure device for hydraulic brakes of motor vehicles a master pressure cylinder, a differential working piston in the cylinder and forming therewith an annular chamber and a full-surface chamber at opposite sides of the piston, pressure piping connected to the annular chamber of the cylinder, a pressure valve in a passage between said chambers and opening towards the annular chamber, means for connecting the annular chamber and the full-surface chamber of the master cylinder in the rest position of the piston, an auxiliary piston disposed in a cylinder chamber between the differential piston and a fluid supply, a pressure spring loading the auxiliary piston towards the working piston, a stop for the two pistons between them, a spring loaded suction valve located in the auxiliary piston and opened by the suction stroke of the working piston, the packing cup of the auxiliary piston forming a seat of the said suction valve, and a stop arranged at the end of the master cylinder and lifting the suction valve in the auxiliary piston on the end of the backward stroke of the said piston.

10. In a pressure device for hydraulic brakes of motor vehicles a master pressure cylinder, a differential working piston in the cylinder and forming therewith an annular chamber and a full-surfaced chamber at opposite sides of the piston, pressure piping connected to the annular chamber of the cylinder, a pressure valve in a passage between said chambers and opening towards the annular chamber, means for connecting the annular chamber and the full-surface chamber of the master cylinder in the rest position of the piston, an auxiliary piston disposed in the master cylinder coaxially with the working piston between the differential piston and a fluid supply, a pressure spring loading the auxiliary piston towards the working piston, a stop for the two pistons between them, a spring loaded suction valve located in the auxiliary piston and opened by the suction stroke of the working piston, the packing cup of the auxiliary piston forming a seat of the said suction valve, and a stop arranged at the end of the master cylinder and lifting the suction valve in the auxiliary piston on the end of the backward stroke of the said piston.

11. In a pressure device for hydraulic brakes of motor vehicles, a master pressure cylinder, a differential working piston in the cylinder and forming therewith an annular chamber and a full-surfaced chamber at opposite sides of the piston, pressure piping connected to the annular chamber of the cylinder, a pressure valve in a passage between said chambers and opening towards the annular chamber, a bypass connecting the annular chamber and the full-surface chamber of the master cylinder in the rest position of the working piston, an auxiliary piston disposed in a cylinder chamber between the differential piston and a fluid supply, a pressure spring loading the auxiliary piston towards the working piston, a stop for the two pistons between them and a spring loaded suction valve located in the auxiliary piston and opened by the suction stroke of the working piston.

12. In a pressure device for hydraulic brakes of motor vehicles, a master pressure cylinder, a differential working piston in the cylinder and forming therewith an annular chamber and a full-surfaced chamber at opposite sides of the piston, pressure piping connected to the annular chamber of the cylinder, a pressure valve in a passage in the working piston between said chambers and opening towards the annular chamber, a stop lifting the said pressure valve off its seat in the rest position of the working piston, an auxiliary piston disposed in a cylinder chamber between the differential piston and a fluid supply, a pressure spring loading the auxiliary piston towards the working piston, a stop for the two pistons between them and a spring loaded suction valve located in the auxiliary piston and opened by the suction stroke of the working piston.

JIŘÍ BĚLENKIJ.